US008595546B2

(12) United States Patent
Dalton

(10) Patent No.: US 8,595,546 B2
(45) Date of Patent: Nov. 26, 2013

(54) SPLIT BRAIN RESISTANT FAILOVER IN HIGH AVAILABILITY CLUSTERS

(75) Inventor: Michael W. Dalton, San Francisco, CA (US)

(73) Assignee: Zettaset, Inc., Mountain View, CA (US)

( * ) Notice: Subject to any disclaimer, the term of this patent is extended or adjusted under 35 U.S.C. 154(b) by 285 days.

(21) Appl. No.: 13/317,803

(22) Filed: Oct. 28, 2011

(65) Prior Publication Data

US 2013/0111261 A1    May 2, 2013

(51) Int. Cl.
*G06F 11/00* (2006.01)
(52) U.S. Cl.
USPC .......................................... 714/4.1; 714/819
(58) Field of Classification Search
USPC ......................................... 714/4.1, 819–824
See application file for complete search history.

(56) References Cited

U.S. PATENT DOCUMENTS

| | | | |
|---|---|---|---|
| 5,261,085 A | 11/1993 | Lamport | |
| 7,194,652 B2 | 3/2007 | Zhou et al. | |
| 7,441,150 B2 | 10/2008 | Abe | |
| 7,590,886 B2 | 9/2009 | Moscirella et al. | |
| 7,814,301 B2 | 10/2010 | Arumugham et al. | |
| 7,949,837 B2 | 5/2011 | Holt | |
| 7,953,890 B1 | 5/2011 | Katkar et al. | |
| 7,971,005 B2 | 6/2011 | Holt | |
| 8,001,413 B2 | 8/2011 | Wetmore et al. | |
| 2007/0009066 A1* | 1/2007 | Fredriksson | 375/326 |
| 2009/0249174 A1* | 10/2009 | Lamb | 714/819 |

OTHER PUBLICATIONS

Burrows, Mike, "The Chubby lock service for loosely-coupled distributed systems", Google Inc., Operating Systems Design and Implementation (OSDI), 2006, pp. 1-16.
Hunt et al., "ZooKeeper: Wait-free coordination for Internet-scale systems", Proc. 2010 Usenix Annual Technical Conference, 2010, pp. 1-14, Berkeley, CA, USA.
Lamport, Leslie, "The part-time parliament", ACM Transactions on Computer Systems, 1998, pp. 133-169, vol. 16, Issue: 2, ACM.
Mazières, David, "Paxos Made Practical", 2007, pp. 1-11, http://net.pku.edu.cn/~course/cs501/2008/cprj/paxos.pdf.
Mills, D.L., "Internet Time Synchronization: The Network Time Protocol", IEEE Transactions on Communications, Oct. 1991, pp. 1482-1493, vol. 39, Issue: 10, IETF.
Paxos (computer science), Wikipedia, http://en.wikipedia.org/wiki/Paxos_(computer_science), modification of Aug. 25, 2011, pp. 1-18.
Reed et al., "A simple totally ordered broadcast protocol", Proc. of 2nd Workshop on Large-Scale Distributed Systems and Middleware (LADIS), ACM Press, Jan. 2008, p. 1-6.

(Continued)

*Primary Examiner* — Bryce Bonzo
(74) *Attorney, Agent, or Firm* — Marek Alboszta

(57) ABSTRACT

Method and high availability clusters that support synchronous state replication to provide for failover between nodes, and more precisely, between the master candidate machines at the corresponding nodes. There are at least two master candidates (m≥2) in the high availability cluster and the election of the current master is performed by a quorum-based majority vote among quorum machines, whose number n is at least three and odd (n≥3 and n is odd). The current master is issued a current time-limited lease to be measured off by the current master's local clock. In setting the duration or period of the lease, a relative clock skew is used to bound the duration to an upper bound, thus ensuring resistance to split brain situations during failover events.

23 Claims, 4 Drawing Sheets

(56) References Cited

OTHER PUBLICATIONS

Wang et al., "Clock synchronization for Internet measurements : a clustering algorithm", Computer Networks, 2004, pp. 731-741, vol. 45, Issue: 6.

Zander et al., "An Improved Clock-Skew Measurement Technique for Revealing Hidden Services", 17th USENIX Security Symposium, San Jose, CA Jul. 2008.

PCT/US2012/061740, International Search Report and Written Opinion of the International Searching Authority, Feb. 25, 2013, pp. 1-9.

* cited by examiner

SPLIT BRAIN RESISTANT FAILOVER IN HIGH AVAILABILITY CLUSTERS

FIELD OF THE INVENTION

This invention relates generally to limiting failure and data loss in high availability clusters of machines that serve network clients, and more specifically it relates to providing for failover between cluster machines in a pool of master candidates while avoiding split brain situations between them.

BACKGROUND ART

Present day computer clusters are typically geographically collocated. Such clusters are also constituted by a large number of nodes. Each node is associated with a corresponding server, computer, or other node device generally referred to simply as a machine. Clusters have resources such as storage devices, e.g., hard disks or other mass storage devices, as well as many types of peripheral resources (e.g., monitors, printers). In addition, the infrastructure of a typical computer cluster contains switches, routers, hubs and the like. With the aid of this infrastructure a client, e.g., a personal computer, can connect to the cluster via a wide area network (WAN) such as the Internet and take advantage of the cluster's services and resources. Most common services involve remote applications such as electronic mail.

Although the cluster is connected to the wide area network, it usually runs on its own separate local area network (LAN). The local network offers private connections between nodes. These can be used, e.g., for communications between nodes and other useful functions. Such functions include distribution of a synchronization signal (master clock) and delivery of heartbeat signals between nodes to verify their status or to independently access the various cluster resources.

Until recently, cluster resources, and mass storage in particular, were typically shared between the nodes. Unfortunately, shared storage resources usually introduce a single point of failure in the cluster. Furthermore, shared storage resources are very sensitive to split brain situations in which cluster nodes may be live but lose network connectivity between them. In these situations, the nodes may independently race to take over control of the cluster and its resources. This may lead to very detrimental results, e.g., when two or even more nodes manage to mount and write to file systems concurrently.

Nodes of a cluster require coordination to ensure tolerance to node failure. For this reason, one node is usually chosen as the active, leader or master node. When the master node fails, the cluster automatically switches over to a new master in a process called failover. Clearly, it is desirable to ensure that the failover process be rapid and that any service disruption experienced by the clients be minimized. This is especially true for the more recent "high availability" clusters that strive to provide virtually uninterrupted service to many clients.

Of course, prior to the advent of computer clusters, fault tolerance in individual computers was a known issue. In particular, the idea of providing computers with redundant central processing units (CPUs), power, buses, etc. and ensuring failover between them has been described by many references. For example, U.S. Pat. No. 7,441,150 to Abe discloses a fault tolerant computer system and interrupt control method that uses primary and secondary systems.

Unfortunately, the issues involved in failover between systems of a fault tolerant computer and those of a fault tolerant cluster are not sufficiently similar to merely reapply in the new context. Meanwhile, the trend in the last 20 years has been to move away from single machine design towards having distributed systems where individual machines are redundant and can fail, rather than mainframes or individual servers where each individual component is made redundant.

Among a number of prior art approaches to fault-tolerance, the reader will find many protocols for solving consensus in a network of unreliable processors or computers. Consensus is the process of agreeing on one result, such as the network leader, among a group of participants. This problem becomes difficult when the participants, i.e., the individual computers or processors, or their communication medium may experience failures. One of the most effective methods to address this problem involves voting by quorum among the participating computers to elect and change their leader. The Paxos protocol is one of the best-known prior art approaches to quorum voting and the necessary execution steps. A number of the salient aspects of this protocol are addressed in U.S. Pat. No. 5,261,085 to Lamport.

The prior art also contains numerous teachings on appropriate synchronization architecture and methods in order to speed up failover and minimize service disruption in computer clusters. For example, U.S. Pat. No. 7,194,652 to Zhou et al. teaches a "high availability" system where one control processor is "active" while another control processor is kept in a "standby" mode. The standby processor is continuously provided with state information of the active processor in the form of a "standby image". Since the standby image is synchronized to the active image a rapid transition to the active mode by the standby processor is possible when the active control processor fails. Although this approach is appropriate for failover in high availability clusters, the method and architecture taught by Zhou et al. do not address the split brain problem.

U.S. Pat. No. 7,590,886 to Moscirella et al. also addresses the issue of facilitating device redundancy in a fault-tolerant system. The system has devices in active and standby roles. A periodic advertisement with an incrementing configuration sequence number is exchanged with each of the devices in the active role and the redundancy group to ensure fault-tolerance. The state changes of the devices are propagated asynchronously. This teaching enables a fault-tolerant system but is not appropriate for a high availability cluster with many nodes, resources and large amounts of state information. In particular, in a cluster application the teachings of Moscirella et al. would not enable efficient failover and resistance to split brain situations.

In U.S. Pat. No. 7,953,890 Katkar et al. teach how to switch to a new cluster coordination resource or cluster coordinator machine. To prevent split brain situations, the coordinator is a single machine that determines what services can and cannot run at a given point in time. In this approach each node in the cluster needs to commit to use the new coordinator resource. This means that when one or more nodes are offline the cluster or a portion of it may be disabled. Furthermore, the approach applies at the level of the entire cluster, rather than at the lower level of the individual cluster nodes. Finally, since the coordinator is a single machine, efficient failover is not provided for, unless the coordinator is brought back up.

Additional teaching on the subject of failover while assisting in the prevention of split brain situations at the cluster level is found in U.S. Pat. No. 8,001,413 to Wetmore et al. In this case, the teaching is applied at the level of entire data center sites. The data centers register with a datacenter activation coordinator who determines when the datacenter activates its services. Timeouts are used to ensure that a passive/backup data center and a formerly active data center cannot both 'go live' simultaneously, thereby assisting in the prevention of split brain situations. Although Wetmore's teachings do address split brain situations to avoid having two data centers coming online simultaneously, they are not appropriate for automated failover between individual cluster nodes with concurrent prevention of split brain situations between these cluster nodes.

In fact, despite the fact that many useful methods and protocols are available, the prior art does not provide an integrated and effective method to ensure failover and prevent split brain situations in a high availability cluster.

OBJECTS AND ADVANTAGES OF THE INVENTION

In view of the shortcomings of the prior art, it is an object of the invention to provide an integrated method to achieve brain split resistant failover in a high availability cluster. More precisely, it is an object of the invention to combine quorum-based majority voting strategies with time-limited leases to ensure highly fault-tolerant cluster operation.

It is another object of the invention to ensure that the method can be easily deployed with standard networking protocols that use quorum-based majority voting, including, for example, the Paxos protocol or the ZooKeeper Atomic Broadcast protocol.

It is still another object of the invention to provide for fast, split-resistant failover with the aid of synchronous state replication, which permits safe failover of even legacy applications that write to a local hard disk.

These and many other objects and advantages of the invention will become apparent from the ensuing description.

SUMMARY OF THE INVENTION

The objects and advantages of the invention are secured by a method for replicating states synchronously to provide for failover between nodes of a high availability cluster. The nodes have appropriate machines, e.g., computers, servers or other devices with processing capabilities, to serve one or more network clients. In accordance with the method, a number m of master candidates and a number n of quorum machines are identified among machines belonging to the cluster. To provide for failover, there should be at least two master candidates (m≥2). To ensure a meaningful quorum there should be at least three quorum machines and their number should be odd (n≥3 and n is odd).

Although it is possible for machines to share functions, i.e., a master candidate could in principle also be a quorum machine, it is preferable that master candidates and quorum machines are different machines. Furthermore, although the quorum machines are typically collocated in a given cluster, they should preferably be isolated from each other.

During operation, each of the m master candidates is synchronously updated to maintain a current state. The state includes the set of machine inputs that will be executed deterministically by the application (code) running on the machine. Note that the output of any machine starting with the same machine inputs and running the same application will be the same. It is preferable that the synchronous updating between the machines be performed over a local area network. Meanwhile, the service will usually involve communication over a wide area network via which the network client accesses the cluster. Suitable wide area networks include the Internet.

The method further calls for electing a current master from among the m master candidates. The election is performed by a quorum-based majority vote (also referred to in the art as "quorum-based majority vote leadership election" or "quorum-based majority vote distributed consensus") among the quorum machines. The current master thus elected is issued a current time-limited lease of a certain duration, preferably on the order of a few seconds to a few tens of seconds. The lease is measured off by a local clock that belongs to the current master. While holding the lease, or, differently put, until the expiration of the lease, the current master runs the one or more services requested by the one or more network clients.

In accordance with the invention, the relative clock skew of the current time-limited lease is bounded by an upper bound. The step of bounding the relative clock skew is preferably based on estimating the relative clock skew from comparing delays between data corrections. Then, the upper bound is adjusted based on these delays. Alternatively, the upper bound is determined from a physical property of the local clock. It is known that clocks drift due to various factors, herein referred to in general as physical properties. Some of the most suitable physical properties for the purposes of the present invention include thermal drift and oscillator drift. Still another approach to bounding the relative clock skew can be implemented from a comparison with a central clock that is either collocated (in the cluster) or external.

When configured in accordance with the present method, a failure of the current master will trigger failover to a new master from among the m master candidates. The new master is issued a new time-limited lease, and after waiting for a period of time no less than the maximum clock skew, starts the master service. This method effectively prevents split brain situations between master candidates, whether they are current masters or not. That is in large part due to the fact that the failed master's lease is limited in time and for further reasons explained below in the detailed description.

In a preferred embodiment, the method further extends to electing a current back-up master among the m master candidates. Thus, the succession, in case current master fails, is determined prior to failover. Once again, the vote is a quorum-based majority vote between the quorum machines. In the event of current master failure, the failover proceeds to the current back-up master.

In some embodiments, the number m of candidate master machines is expanded or contracted dynamically. In expanding number m, a new candidate machine belonging to the high availability cluster is identified and synchronously updated to maintain the current state. Once the new candidate machine has the full, current state, the new candidate machine is added to the m master candidates and number m is incremented (m=m+1). Similarly, in contracting number m, a certain candidate machine among the m master candidates is identified and removed from among the master candidates. The number m is correspondingly decremented (m=m-1).

The method of the invention is particularly well suited for serving legacy applications to the one or more network clients. The legacy application can reside on any of the suitable resources of the high availability cluster.

The method of invention also extends to operating a high availability cluster serving one or more network clients. The method provides for failover between nodes of the high availability cluster without split brain situations. As described above, m master candidates, where m≥2, and n quorum machines, where n≥3 and is odd, are first identified from among the cluster machines. The m master candidates are synchronously updated to maintain the current state. The current master is elected from among the m master candidates through quorum-based majority vote taken between the quorum machines. The current master is issued current time-limited lease, to be measured by its local clock, and while holding this time-limited lease the current master runs the service requested by the network client(s).

The time-limited lease is bounded by the relative clock skew to an upper bound. When a failure of the current master occurs, it triggers failover to a new master, which is issued a new time-limited lease.

The invention also applies to high availability cluster with failover capability between its machines without split brain situations. Once again, m master candidates and n quorum machines are identified among the machines in the cluster, where m≥2 and n≥3 and n is odd. The local network is used for synchronously replicating and updating the m master candidates.

A quorum-based majority vote protocol is implemented by the n quorum machines to elect a current master form among the m master candidates. Furthermore, a mechanism is provided for issuing a current time-limited lease to the current master. The current time-limited lease is measured off with the local clock belonging to the current master. The relative clock skew of the current time-limited lease is bounded with the aid of a physical parameter to an upper bound.

Failure of the current master triggers failover to a new master, which is issued a new time-limited lease. The use of time-limited leases with an upper bound determined from relative clock skew avoids split brain situations. Such situations may arise when different master candidates assume that they are the current master during a failure condition, such as loss of connection between the machines.

The quorum-based majority vote protocol can be implemented in many different ways. For example, the Paxos protocol or ZooKeeper cluster management may be employed in the high availability cluster. Furthermore, the high availability cluster in accordance with the present invention is particularly well suited for serving data that are particularly sensitive to accidental over-writes, such as domains names. Hence, an advantageous application of the present invention occurs when the master candidates are NameNode master candidates.

The cluster may implement various configurations and architectures. Furthermore, the nodes preferably utilize a storage system whose resources are distributed over the cluster. For example, the storage system is composed of numerous block storage devices, e.g., hard disk drives.

The invention, including the preferred embodiment, will now be described in detail in the below detailed description with reference to the attached drawing figures.

BRIEF DESCRIPTION OF THE DRAWING FIGURES

DETAILED DESCRIPTION

Figure 1:
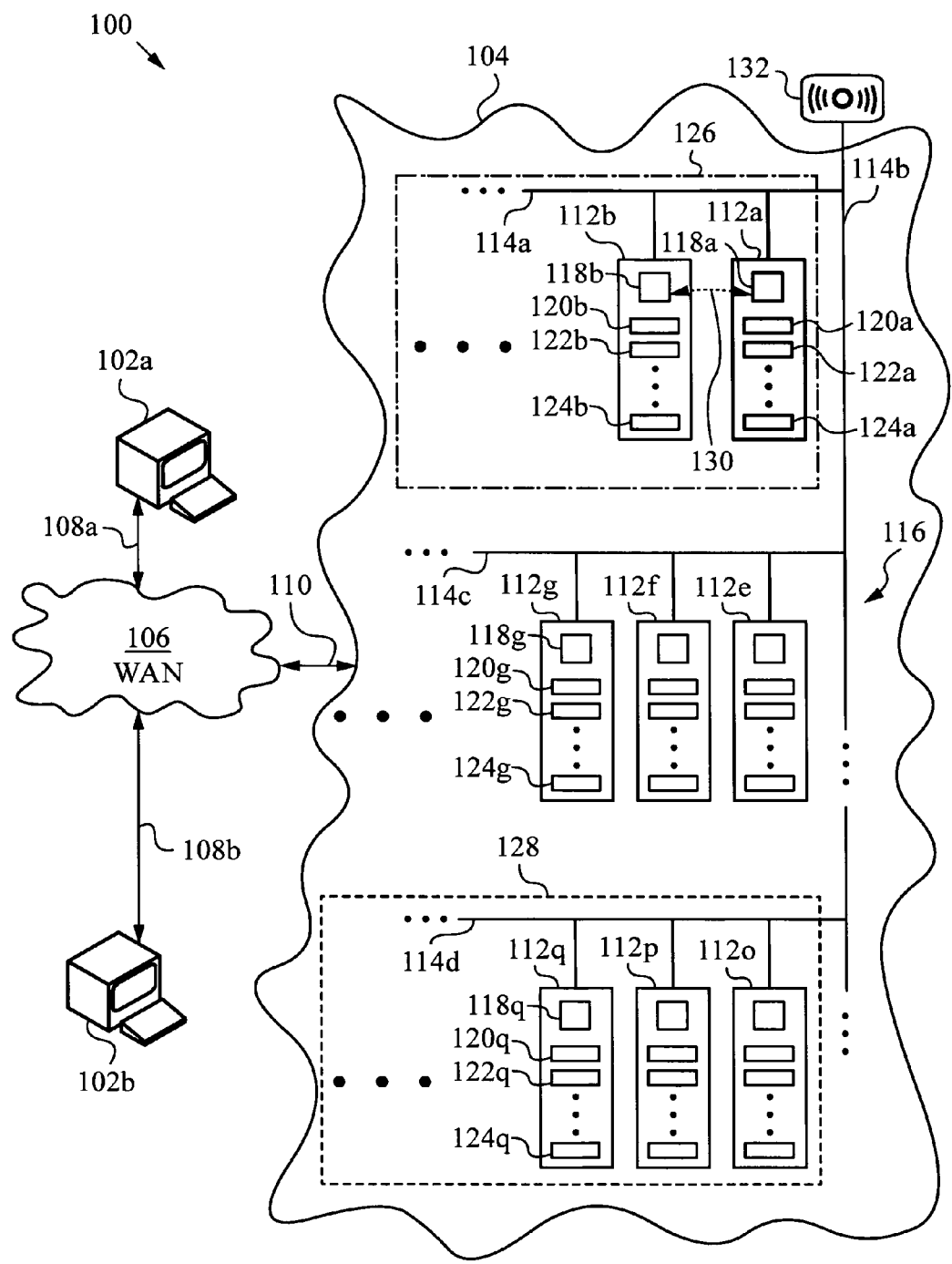
FIG. 1 is a diagram of a networking system with a high availability cluster showing the main aspects of the invention.

The present invention will be best understood by initially referring to the high-level diagram of FIG. 1. This diagram shows a networking system 100 in which network clients 102a, 102b are connected to a high availability cluster 104. Only two clients 102a, 102b are shown in FIG. 1 for reasons of clarity. It will be appreciated, however, that cluster 104 typically supports a large number of clients, e.g., on the order of thousands, tens of thousands or even larger.

Networking system 100 includes a wide area network 106, or WAN, such as the Internet and/or still other single or multiple wide area networks. It is important that WAN 106 be accessible to clients 102a, 102b at locations where services deployed on high availability cluster 104 are provided. Physical connections 108a, 108b between clients 102a, 102b and WAN 106 can be accomplished by any suitable technology including wired, wireless, optical waveguides and the like. WAN 106 is connected to cluster 104 via a network-to-network interface 110, which is preferably a very high-throughput pipe.

Cluster 104 has a number of nodes 112a, 112b, ... 112q, of which only some are explicitly shown in FIG. 1 for reasons of clarity. Typically, nodes 112a through 112q of cluster 104 are geographically collocated, and may even be housed in the same building. Further, nodes 112a through 112q are interconnected by lines 114a-d of a local area network 116, or LAN. Thus, nodes 112a through 112q can communicate among each other "privately" via LAN 116, rather than via WAN 106.

Each node 112a through 112q has a corresponding processor, server, computer or other device with processing capabilities generally referred to herein as machine 118a through 118q. In addition, each node 112a through 112q has associated with it a set of resources 120a through 120q, 122a through 122q, and 124a through 124q. Additional resources beyond those expressly called out can be present at each node 112a through 112q, as indicated by the ellipsis. For reasons of visual clarity, not all machines 118a-q and not all resources 120a-q, 122a-q, 124a-q are explicitly labeled in FIG. 1.

It should be understood, that designated resources 120a-q, 122a-q, 124a-q and any additional resources not expressly called out can be distributed in any permissible manner. For example, the resources at any given node may be the same as those at one or more other nodes or they may be partly different. Indeed, the resources may even be entirely unique to a particular node of cluster 104. Exemplary resources 120a-q, 122a-q, 124a-q include printers, monitors, application-specific processors, block storage devices including hard drive devices (e.g., parallel or serial, such as SATA), flash drives and any other cluster resources. In fact, any physical or logical component that can be brought on-line and off-line, managed in cluster 104 and hosted by just one of nodes 112a-q at a time can be represented among the set of resources 120a-q, 122a-q and 124a-q.

In accordance with the invention, a number m of master candidates is identified among machines 118a-q belonging to cluster 104. Specifically, two machines, 118a and 118b are identified as master candidates in the embodiment shown in FIG. 1. The number m is thus 2 in this case (m=2), and it corresponds to the smallest permissible number of master candidates according to the invention.

A dashed-and-dotted box 126 designates a pool of master candidates. Master candidates 118a, 118b belong to pool 126. The ellipsis indicate that additional master candidates selected from among machines 118c-q can be brought into pool 126. In fact, pool 126 can be incremented or decremented dynamically, as long as m≥2 at all times. Furthermore, there is no theoretical upper bound on number m of master candidates in pool 126. In practice, for reasons addressed in detail below, writes will need to be synchronously replicated between all master candidates so as to keep them updated with the current state of the current master. Thus, using a configuration with more than four master candidates (m=4) will markedly increase write latency without commensurately improving system availability.

A dashed box 128 designates a pool of quorum machines. Quorum machines are also identified among machines 118a-q belonging to cluster 104. In the present embodiment, the number n of quorum machines in pool 128 is three (n=3). Specifically, machines 118o, 118p and 118q are in pool 128. The ellipsis indicate that additional quorum machines can be included in pool 128. However, in accordance with the invention, the number n must always be at least three and odd (n≥3 and n is odd). This means that pool 128 can only be expanded or contracted by two machines at a time. The reason for keeping n odd is to ensure that any division of pool 128 into two subsets will always produce one subset with a majority of machines.

Although it is possible for machines 118a-q to share functions, i.e., a master candidate could in principle also be a quorum machine, it is preferable that master candidates and quorum machines be different. In other words, pool 126 of master candidates (i.e., machines 118a, 118b in this embodiment) and pool 128 of quorum machines (i.e., machines 118o, 118p, 118q in this embodiment) do not have any machines in common. Still differently put, pools 126 and 128 are non-overlapping.

Although quorum machines 118o, 118p, 118q are typically collocated in cluster 104, they should preferably be isolated from each other. In other words, since usually all machines 118a-q of cluster 104 are in the same building, as already remarked above, provisions for isolating quorum machines 118o-q should be provided in the preferred embodiment. These provisions are not expressly shown in FIG. 1. Typically, in a suitably isolated environment, quorum machines 118o-q would use separate network switches and they would not share the same power supply.

In accordance with the invention, the states of master candidates 118a, 118b are updated synchronously, as indicated by dashed arrow 130. Preferably, the interconnection afforded by line 114a of LAN 116 between master candidates 118a, 118b is employed for this purpose. In other words, it is preferable that synchronous updating between machines 118a, 118b that are identified as master candidates be performed over LAN 116 rather than WAN 106 or some other network or connection.

In asynchronous updates, there is no coordination between master candidates 118a, 118b residing at nodes 112a, 112b. In contrast, synchronous updates require master candidates 118a, 118b to make their previous output available until the update is complete. It is therefore necessary in synchronous updates to store both the current state, also referred to as current state vector, and the next state, also referred to as next state vector. The state or state vector includes the set of machine inputs that will be executed deterministically by the application (code) running on machine 118a or 118b. That is because the output of any machine starting with the same machine inputs and running the same application will be the same. Ensuring that the input and output state vectors stored on machines 118a, 118b are identical thus provides for a high level of safety in case of failure.

For the purposes of the present invention, the most recent or last state vector stored during synchronous updates between master candidates 118a, 118b will be referred to as the current state. The current state may be stored on non-volatile media (magnetic hard drive, flash drive, tape) to provide durability in the event of a power failure that affects all master candidates 118a, 118b. Because of this wide range of choices that a person skilled in the art will appreciate, the actual resources employed for storing the current state are not expressly indicated in the drawing figure. It should also be noted that any among resources 120a-q, 122a-q and 124a-q could represent a non-volatile media for storing the current state. Furthermore, it is possible to design a high-availability architecture where this replicated current state is stored entirely in volatile memory. In such a design, however, a power failure could result in loss of current state information.

Cluster 104 also has access to a central clock 132. Central clock 132 can be a local device belonging to cluster 104, or it can be a remote device. In the preferred embodiment, central clock 132 is local and resides in cluster 104. For example, central clock 132 may reside at a particular node 112 of cluster 104. Furthermore, in the preferred embodiment clock 132 periodically adjusts its time based on an external standard, e.g., an atomic clock or some other standard time reference.

Networking system 100 with high availability cluster 104 is well suited for providing various types of services to network clients 102a, 102b. The services may involve highly diverse applications such as: electronic mail, financial transactions, interactions with Domain Name Servers (DNS) and other metadata services, and even legacy applications capable of being served over networking system 100. Some of these services are extremely sensitive to failures. In particular, failures in which actions of clients 102a, 102b or other events precipitate accidental over-writing of data, e.g., of a DNS entry, are to be avoided.

Now, it is well known to place a master in charge of a high availability cluster to prevent the above-mentioned types of failures. The master supervises the cluster by processing all requests, in particular those that update any state in the cluster (e.g., any requests that include a write). The master processes, commits and broadcasts to the remainder of the cluster to ensure agreement on how the requests are handled. Such master-based, hierarchical approach helps to prevent data corruption through accidental over-writes and other failures.

The implementation of master-based cluster management is embodied by management software such as ZooKeeper in conjunction with suitable broadcasting protocols (e.g., an atomic broadcasting protocol). For further information on such cluster management software the reader is referred to Patrick Hunt, et al., "ZooKeeper: Wait-free coordination for Internet-scale systems", Proceedings of the 2010 USENIX Annual Technical Conference (ATC), June 24, Boston Mass., pgs. 1-14. Prior art regarding suitable broadcast protocols is found, e.g., in Benjamin Reed et al., "A simple totally ordered broadcast protocol", Proceedings of the 2008 Workshop on Large Scale Distributed Systems and Middleware (LADIS), September 15, Yorktown, N.Y.

In addition, it is also known that a master should be monitored. Should a current master fail, then a new master should be elected from among eligible machines. Many protocols for such elections are known to those skilled in the art. Some of the most robust among those involve quorum-based majority votes. A well-known protocol for quorum-based majority vote originally proposed by L. Lamport is called the Paxos protocol and it is described under the entry: "Paxos (computer science)" in Wikipedia, the free encyclopedia and in Lamport L., "Paxos Made Simple", ACM SIGACT News 32, 4 (2001), pp. 18-25.

The prior art approaches to master-based cluster management, suitable broadcast protocols and quorum-based majority vote in master elections clearly help to limit the number of failures. However, failures still occur in the process of automatic transition (automatic switch-over) or failover from a failed current master to a new master. Such failures are most commonly due to a split brain situation that arises during failover. In this condition, two or more cluster machines may act as masters and cause failures, such as accidental overwriting of data.

In accordance with the present invention, high availability cluster 104 is designed to support failover without split brain situations. The first step to achieve this goal involves electing a current master from among the m master candidates 118a, 118b in pool 126. The election is performed by quorum machines 118o, 118p, 118q that make up pool 128.

Figure 2:
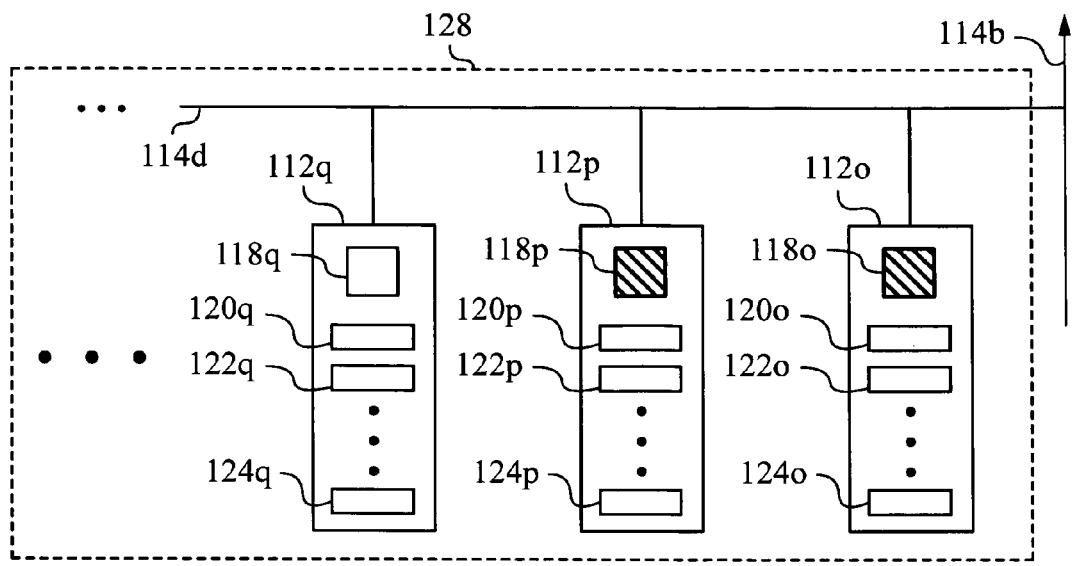
FIG. 2 is a detailed diagram of the pool of quorum machines in the high availability cluster of FIG. 1.

FIG. 2 is a more detailed diagram of pool 128 of quorum machines 118o-q in high availability cluster 104. Although, as remarked above, the ellipsis indicate that pool 128 can contain more than three quorum machines 118o-q ($n \geq 3$ and n is an odd number) the explanation will be presented for n=3. The election is performed by a quorum-based majority vote (also referred to in the art as "quorum-based majority vote leadership election" or "quorum-based majority distributed consensus") among quorum machines 118o-q of pool 128. Since n is odd, a majority vote is always ensured.

Figure 3:
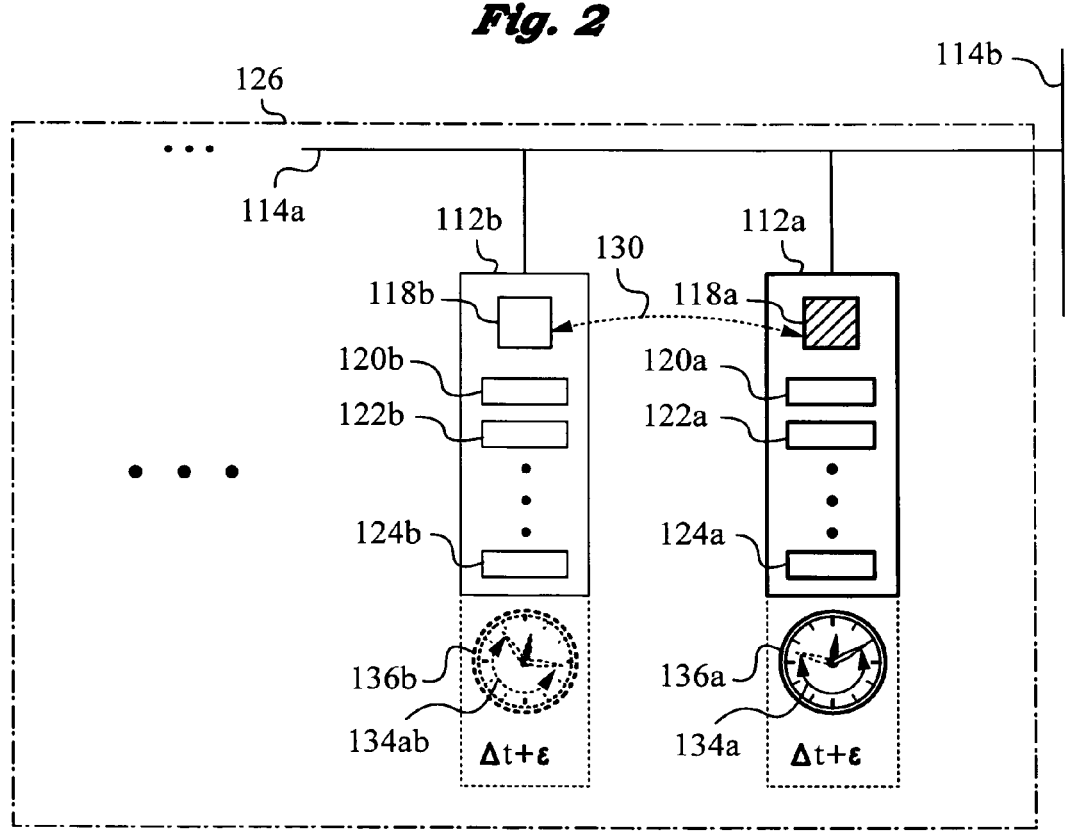
FIG. 3 is a detailed diagram of the pool of master candidates in the high availability cluster of FIG. 1.

FIG. 3 is a more detailed diagram of pool 126 of master candidates 118a, 118b on which quorum machines 118o-q vote. Again, as the ellipsis indicate, pool 126 can contain more than two master candidates 118a, 118b ($m \geq 2$), but the explanation will be presented for m=2 to keep matters simple.

To operate cluster 104, quorum machines 118o-q elect a current master. In the case shown, machine 118a is elected as the current master by a quorum-based majority vote. As marked in FIG. 2 by corresponding hatching, machines 118o-p constituted the majority voting for machine 118a. Similarly, a corresponding hatching in FIG. 3 indicates that machine 118a is the current master. The actual quorum-based majority vote protocol is well known in the art and will not be described herein. For corresponding teachings the reader is once again referred to the description of the Paxos protocol (op. cit.).

Current master 118a thus elected by quorum-based majority vote is issued a current time-limited lease 134a. Lease 134a is schematically indicated in FIG. 3 by an arrow demarcating a duration on a local clock 136a belonging to current master 118a. In fact, lease 134a is designed to be measured off by local clock 136a. The duration of lease 134a is preferably on the order of a few seconds to a few tens of seconds. In the example shown in FIG. 3, the duration of lease 134a is about 40 seconds.

The duration of time-limited lease 134a is chosen as a reasonable tradeoff between the time to detect that current master 118a has truly failed, versus the cost of a failover event. A very low or short time duration of lease 134a may incorrectly determine that current master 118a has failed and initiate or trigger failover when it is unnecessary. A very high or long time duration of lease 134a is unlikely to initiate or trigger an unnecessary failover, but it may result in an extended period of time being necessary to detect a legitimate current master 118a failure. Determining the appropriate duration of time-limited lease 134a depends largely upon the cost of an unavailable master and the time it takes to perform the failover operation in the underlying. In practice, for reasonable sizes of current state (on the order of megabytes to gigabytes) that is already synchronously replicated, seconds to tens of seconds provides an effective balance.

While current master 118a holds lease 134a, master candidate 118b also measures of the same lease on its local clock 136b. However, as explained in more detail below, clocks 136a, 136b are not generally synchronized and are not running at the same frequency. Thus, the duration of lease 134a as measured by clock 136a is designated as lease 136ab and may differ in proper or absolute time from the duration of lease 134a as measured by local clock 136a.

Current master 118a is authorized to act as master while holding lease 134a. In other words, while lease 134a is unexpired as measured by its own local clock 136a, current master 118a has the authority to serve or run the one or more services requested by clients 102a, 102b. These services typically include execution of write requests.

While acting as current master 118a, its states or state vectors are synchronously replicated to the other master candidate 118b, as indicated by arrow 130. In fact, any machines 118 in pool 126 of master candidates have to synchronously replicate current states of current master 118a in order to be considered a master candidate. This ensures that at every step, master candidate 118b and any other master candidates in pool 126 are updated and maintain the current state of current master 118a. The synchronous update is performed via LAN 116, and more particularly via line 114a.

To avoid split-brain situations during failover, the relative clock skew of current time-limited lease 134a is bounded by an upper bound. Specifically, time-limited lease 134a is set equal to a duration $\Delta t$ plus an additional time allowance $\epsilon$. This effectively bounds lease 134a to a period with an upper bound of at most $\Delta t + \epsilon$, as indicated in FIG. 3. The actual value to be used for $\epsilon$ is based on the relative clock skew of local clocks 136a and 136b.

The new master is issued a new time-limited lease, and after waiting for a period of time no less than the maximum clock skew, starts the master service.

To understand how to determine $\epsilon$, we have to first understand clock skew. All cluster nodes 112a-q, as well as routers (not shown) and clients 102a, 102b possess local clocks. Such clocks are constructed from hardware and software components well known to those skilled in the art. In the present case, we are interested in local clocks 136a 136b of master candidates 118a, 118b and their clock skews.

Local clocks 136a, 136b each have a crystal oscillator that ticks at a nominal frequency and a counter that counts the number of ticks. These clock components are not shown, since they are well known and understood by skilled artisans. Due to their construction, the actual frequencies of local clocks 136a, 136b depend on environmental factors, such as the temperature, humidity and type of crystal. It is the fluctuations in actual frequency registered by the counters that cause a drift in the number of ticks registered per unit proper time by clocks 136a, 136b. This drift is called clock skew.

Changing environmental factors, as well as variable processor load (which directly affects the temperature), cause the clock skews of clocks 136a, 136b to change dynamically. As a direct result of dynamically changing clock skew, clock signals sent from local clocks 136a, 136b arrive at different components at different times.

It is important to note that it is not possible to directly measure a remote clock's true clock skew. Consequently, master candidate 118a cannot directly measure the clock skew of local clock 136b of master candidate 118b and vice versa.

Fortunately, relative clock skew between clocks 136a, 136b can be estimated remotely to determine the value of $\epsilon$. Such estimation is preferably performed by master candidates 118a, 118b before start-up of cluster 104 and on a periodic basis, to account for dynamic changes in relative clock skew, e.g., due to changing environmental factors and processing loads on current master 118a and master candidate 118b.

In the preferred embodiment of the invention, relative clock skew is estimated from comparing delays between data corrections. This is preferably done with the aid of a suitable algorithm, such as the Network Time Protocol. This protocol sends test packets between machines and estimates the relative clock skew after accounting for network transmission delays.

Once the relative clock skew between local clocks 134a and 134b is determined, the value of $\epsilon$ can be assigned. Preferably, the value of $\epsilon$ is chosen as the highest amount of relative clock skew estimated in comparing delays between data corrections. Alternatively, a statistical algorithm can be used over a number of estimates to set the value of $\epsilon$. This is feasible when a statistically significant number of estimates are available for the prevailing set of environmental factors and processing loads. Under these conditions, $\epsilon$ can be set at several standard deviations from the mean estimated relative clock skew between local clocks 134a, 134b. A person skilled in the art will realize that the exact number of standard deviations can be adjusted based on just how failure-resistant cluster 104 needs to be given the types of applications being served to clients 102a, 102b.

Over time, the clock skews of local clocks 134a, 134b as well as the skews of other clocks belonging to cluster nodes 112 will tend to accumulate. Jointly, they will result in cluster 104 with vastly different local times registered at nodes 112. To eliminate these temporal differences, cluster nodes 112 can synchronize their clocks with central clock 132 that measures proper or absolute time. However, the present invention does not rely on synchronization of nodes 112, and of nodes 112a, 112b of master candidates 118a, 118b in particular, to the same absolute time, since it relies on relative clock skew. Because of that, lower-cost machines 118 without high-quality local clocks can be deployed in cluster 104.

Figure 4:
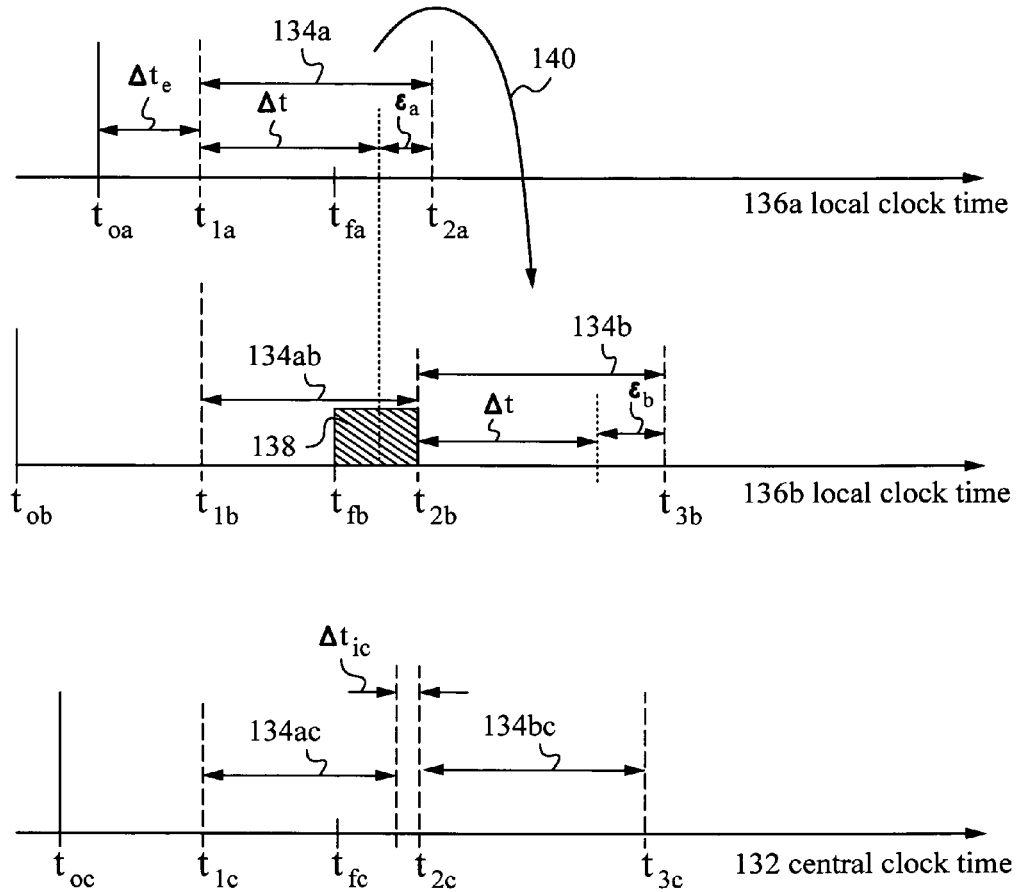
FIG. 4 is a timing diagram illustrating the operation of the time-limited lease that is bounded by the relative clock skew according to the invention.

FIG. 4 illustrates a timing diagram that shows how the above-described time-limited lease 132a of current master 118a bounded to a period of at most $\Delta t+\epsilon$ prevents split brain situations. From the diagram of FIG. 4 it is clear that local clocks 136a, 136b of current master 118a and master candidate 118b are not synchronized in absolute time. Indeed, absolute initial time $t_{oc}$, as registered by central clock 132, is after initial time $t_{ob}$ registered by local clock 136b of master candidate 118b. Meanwhile, initial time $t_{oa}$ registered by local clock 136a of current master 136a is after absolute initial time $t_{oc}$ of central clock 132.

The quorum-based majority vote by quorum machines 118o-q of pool 128, as described above in reference to FIG. 2, takes place during an election time period $\Delta t_e$. Election time period $\Delta t_e$ is indicated only on the time-line of local clock 136a of master candidate 118a for reasons of clarity. At the end of election time period $\Delta t_e$, at time $t_{1a}$ as registered on its local clock 136a, candidate machine 118a is elected current master of cluster 104. This time corresponds to times $t_{1b}$ and $t_{1c}$ on local clock 136b of master candidate 118b and on central clock 132, respectively.

At time $t_{1a}$ on local clock 136a current master 118a receives time-limited lease 134a bounded by relative clock skew of local clock 136a. The upper bound is set based on maximum relative clock skew of clock 136a with clock 136b by choosing the largest value of $\epsilon=\epsilon_a$ obtained when comparing delays between data corrections, as explained above. Thus, current time-limited lease 134a is bounded by an upper bound to a period of at most $\Delta t+\epsilon_a$. In accordance with the invention, during time period $\Delta t$ as measured by its own local clock 136a, current master 118a can presume to remain master of cluster 104.

Now, time period $\Delta t+\epsilon_a$ will last from time $t_{1a}$ until time $t_{2a}$ on current master's 118a local clock 136a. However, in order to avoid split brain situations, current master 118a must be prepared that already after time period $\Delta t$, during period $\epsilon_a$ of its time-limited lease 134a, master candidate 118b could be vying for control of cluster 104. For example, this could be happening if current master 118a had failed, potentially unknowingly, during its lease 134a.

Now, in cluster 104 configured in accordance with the invention, a failure of current master 118a will trigger failover to a new master from among the available master candidates in pool 126. Note that in this embodiment, only one other master candidate 118b is available for failover, since m=2.

As shown in FIG. 4, failure of current master 118a occurs before time $t_{2a}$ at time $t_{fa}$, as registered on its own local clock 136a. The failure may be due to lost connection between current master 118a and LAN 116, intentional disconnection or a malfunction including unreliability or unusability. In fact, current master 118a may not even be aware of its own failure in the context of cluster 104. Therefore, current master 118a will continue measuring off its time-limited lease 134a and attempting to fulfill its duties as master until period $\Delta t$ ends.

Meanwhile, master candidate 118b is also measuring off time period $\Delta t+\epsilon_a$ of lease 134a that was assigned to current master 118a. However, master candidate 118b is using its own local clock 136b to measure off time period $\Delta t+\epsilon_a$. According to its local clock 136b, master candidate 118b will register time period $\Delta t+\epsilon_a$ as lasting for a duration 134ab from time $t_{1b}$ until time $t_{2b}$. Clearly, duration 134ab is not equal to duration 134a. Of course, this difference in duration is due to relative clock skew between local clocks 136a, 136b, as explained above.

Master candidate 118b knows that due to relative clock skew its determination of period $\Delta t$ may differ from period $\Delta t$ as measured off by current master 118a. For this reason, it waits for the additional time $\epsilon_a$, as recorded by its own clock 136b. In other words, master candidate 118b assumes that due to relative clock skew, current master 118a could still potentially be acting as master until time $t_{2b}$ on master candidate's 118b local clock 136b. Thus, in accordance with the present invention, master candidate 118b is instructed not to attempt to become new master, until after time $t_{2b}$.

Now, during time period 136ab between $t_{fb}$ and $t_{2b}$ according to local clock 136b of master candidate 118b, cluster 104 has no master. A master-less period 138 that arises in this way is designated with the aid of hatching in FIG. 4. Clearly, the length of mater-less period 138 that clients 102a, 102b of cluster 104 are willing to tolerate needs to be considered in the trade-offs when setting the duration of time-limited lease 134a, as addressed above.

At time $t_{2b}$ on local clock 136b of master candidate 118b, a failover 140 is triggered from failed master 118a and master candidate 118b becomes the new master. Note that clock 136b is running faster than clock 136a. Thus, time $t_{2b}$ at the end of period 134ab is actually slightly before time 134a has fully expired on clock 136a of failed current master 118a. However, because the value of $\epsilon_a$ was chosen to be the largest possible given relative clock skew between clocks 136a and 136b, there is virtually no possibility, that at time $t_{2b}$ on new master's 118b local clock 136b, failed master 118a is still attempting to act as the master of cluster 104. In fact, as mentioned above, current master 118a would stop presuming to be the master after time duration $\Delta t$, which ends safely prior to time $t_{2b}$ on local clock 136b of new master 118b. Therefore, in accordance with the invention, a split brain situation is effectively avoided.

Upon failover, new master 118b is issued a new time-limited lease 134b. New lease 134b is set for duration $\Delta t$ plus $\epsilon$, with the specific value of $\epsilon=\epsilon_b$ based on maximum relative clock skew estimated between local clocks 136a and 136b. Again, $\epsilon_b$ is preferably computed based on an estimate of delays between data corrections, as explained above. Note that since the value of relative clock skew will in general vary as a function of time, $\epsilon_a$ and $\epsilon_b$ may differ, as shown in FIG. 4.

Yet another way to see why the lack of synchronization with central clock 132 does not impede failover and avoids split brain situations, is by looking at the above activity as perceived by central clock 132. From its perspective, time-limited lease 134a is issued to current master 118a at time $t_{1c}$. The duration of lease 134a as measured by central clock 132 is still different from duration 134ab registered by local clock 136b of master candidate 118b. Namely, the duration of lease 134a as measured by central clock 132 is 134ac.

Duration 134ac is even shorter than 134ab. However, that does not present a problem, since master candidate 118b will not assume control until time $t_{2b}$ on its local clock 136b. That time corresponds to time $t_{2c}$ on central clock 132. Note that during an interim time period $\Delta t_{ic}$ as recorded by central clock 132 there is no split brain situation, thanks to the bounding of the relative clock skew between clocks 136a, 136b to an upper bound with the aid of proper selection of the value of $\epsilon$.

Alternatively, the upper bound on time-limited leases 134a, 134b is determined from a physical property of local clocks 136a, 136b. As mentioned above, clocks 136a, 136b drift due to various environmental factors, e.g., temperature and humidity, as well as their crystal or oscillator properties. Take together, environmental factors and oscillator properties will be referred to herein as physical properties. Some of the most suitable physical properties for the purposes of the present invention include thermal drift and oscillator drift.

In such alternative embodiments the upper bound on any time-limited lease can be equal to duration $\Delta t$ plus the largest amount of relative clock skew due to differences in a chosen physical property or several properties between the master candidates. The most suitable physical properties, because they can be effectively estimated in ways known to those skilled in the art, are the thermal drift and/or the oscillator drift of the local clock.

When employing physical properties to bound relative clock skew, the value of $\epsilon$ is preferably simply set to this largest amount of skew observed. To obtain the duration of time-limited lease, $\epsilon$ is then added to duration $\Delta t$, as before. Of course, the value of $\epsilon$ can be conservatively set even larger to further reduce the likelihood of split brain situations. However, setting $\epsilon$ to be very large will affect the performance of cluster 104, since it will increase the duration of master-less period 138 prior to failover. Therefore, the choice of value $\epsilon$ should be balanced against desired performance of cluster 104, as already remarked above.

Still another approach to bounding the relative clock skew can be implemented from a comparison with central clock 132. In embodiments taking advantage of central clock 132 it should be ensured that the latter is considerably more reliable than local clocks 136a, 136b. This can be done by placing central clock 132 in a suitable controlled environment and/or frequently adjusting it with an external standard, such as an atomic clock.

In concert with implementing time-limited leases and quorum-based majority vote for master election, cluster 104 can also use various lock leases and all kinds of other safeguards. Obviously, such lack of conflict between the present invention and other safeguards and protocols employed in distributed systems and high availability clusters is very advantageous. For exemplary lock leases and corresponding procedures that can be implemented in conjunction with the methods of invention and in clusters according to the invention the reader is referred to Mike Burrows, "The Chubby lock service for loosely-coupled distributed systems", Google Inc., OSDI 2006.

Figure 5:
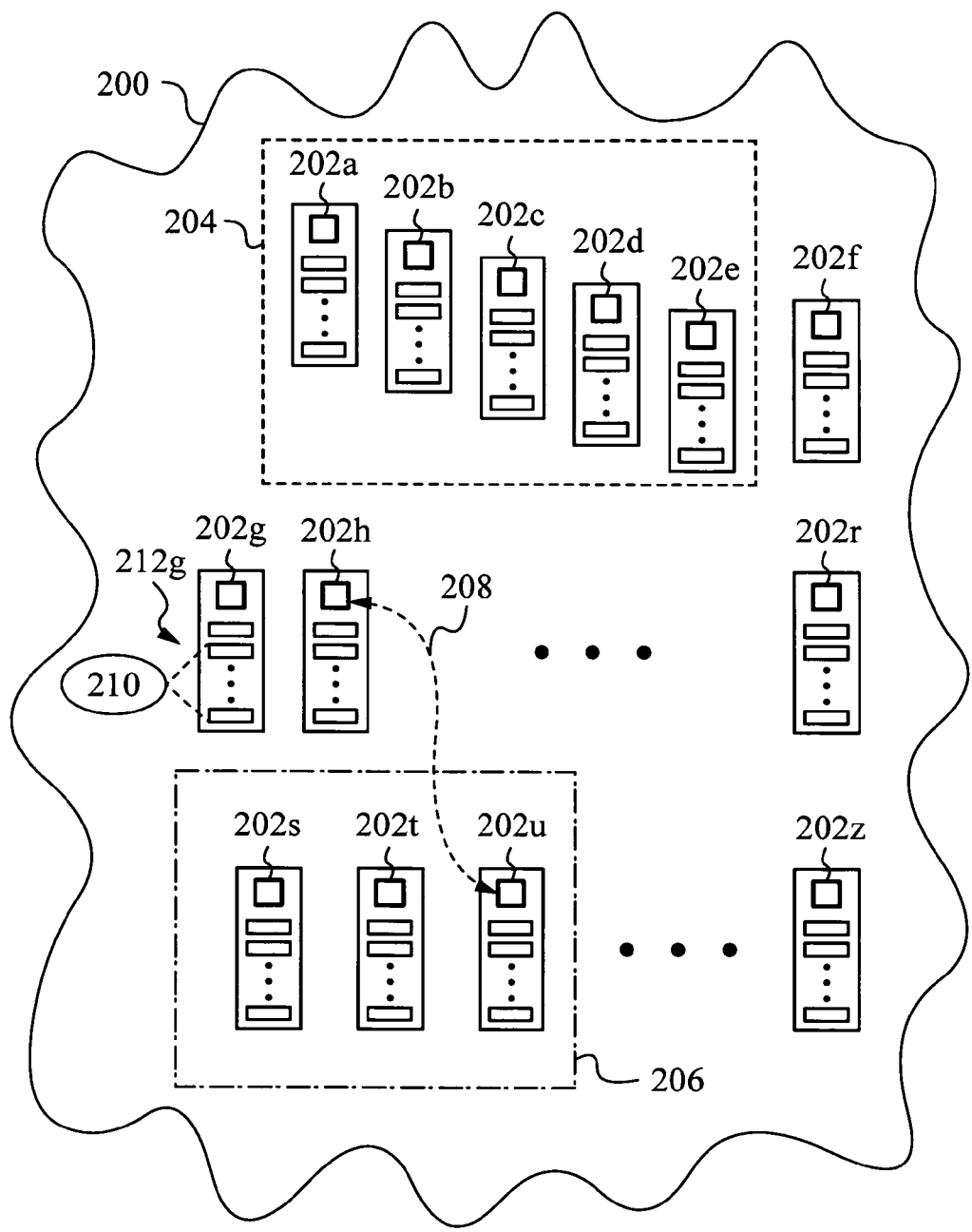
FIG. 5 is a diagram of another high availability cluster according to the invention, deploying time-limited leases with bounds determined from relative clock skew, and quorum-based majority voting.

FIG. 5 is a diagram of another high availability cluster 200 according to the invention. Custer 200 has a number of machines 202a-z. Of those, five machines 202a-e are quorum machines belonging to a quorum machine pool 204. Correspondingly, number n is five (n=5), and it is thus properly larger than 3 and odd. Three machines, namely 202s-u are master candidates belonging to a master candidate pool 206. Therefore, number m is three (m=3), and it is thus larger than 2, as required.

Cluster 300 deploys a time-limited lease to current master with bounds determined from relative clock skew, in the manner explained above. In addition, quorum machines 202a-e are preferably isolated from each other and select a current master from pool 206 through quorum-based majority voting. In the present case, current master elected by pool 204 is machine 202t.

In contrast to the embodiment described previously, the number of master candidates 202s-u is three (m=3), and therefore there is no clear new master candidate for failover. In this case, it is preferable to elect a current back-up master in addition to current master 202t for safety before a failover event. This election is held among quorum machines 202a-e of pool 204 using the same quorum-based majority vote protocol as in the election of current master 202u.

Of course, current master 202u is not subject to the vote for back-up master, since it is already elected as current master. In the present case, quorum machines 202a-e elect machine 202t as back-up master.

With back-up master 202t thus already elected prior to any potential failover, cluster 200 does not need to rely on proper operation of quorum machines 202a-e of pool 204 when current master 202u fails. In this way, no election needs to be held during a failover. The succession, in case current master 202u fails, is determined prior to failover and is not exposed to potential ambiguities that could arise during the failure events that trigger the failover.

In some embodiments, the number m of candidate machines 202s-u can be expanded or contracted dynamically. This may be useful as machines 202 are removed from or added to cluster 200. In other cases, this may be necessary as the duties and responsibilities of present machines 202 are rearranged.

In expanding number m, a new candidate machine 202h belonging to cluster 200 is identified and synchronously updated, as indicated by arrow 208, to maintain the current state of current master 202u. Upon being updated with the current state, new candidate machine 202h is added to the m master candidates 202s-u in pool 206 and number m is incremented (m=m+1 or m=4). However, as noted above, expansion of pool 206 beyond four (m=4) may not be desirable due to possible service time delays.

Similarly, in contracting number m, a certain candidate machine, for example machine 202s among master 202s-u candidates is identified and removed from pool 206. The number m is correspondingly decremented (m=m−1 or m=2). Removal of machine 202s can be performed at any time, since it is neither current master nor back-up master at the time of removal. Once it is removed from pool 206, there is no longer any need to synchronously update machine 202s with the current state.

The method of the invention is particularly well suited for serving legacy applications, such as application 210, to the network clients. Legacy application 210 can reside on any of the suitable resources of the high availability cluster, such as resources 212g of machine 202g.

Legacy application 210 is best supported by transparently performing any necessary state replication using a network block device such as the Distributed Replicated Block Device in the Linux kernel. Legacy application 210 writes its state to a disk in a directory backed by a network block device, which transparently and synchronously replicates application disk writes to the remote hard drives of master candidates 202s-u. Block devices are computer operating system abstractions of any device supporting read and write operations in fixed-size, multiple-byte chunks (such as a magnetic hard disk, flash drive, etc.). Network block devices forward any block write operation to a local block device and one or more remote block devices, synchronously.

When a failover event occurs, the new master may then mount its local block device, which is an exact write-for-write replica of the prior master's local block device, and start legacy service (service of application 210) after waiting for the maximum clock skew time and configuring its network block device layer to replicate all block writes to the other remaining master candidates of pool 206.

This invention is particularly useful for large-scale single-master distributed systems such as the Hadoop Distributed File System, as it provides mechanisms for high-availability automated failover for the single-master service that manages all filesystem metadata. In large distributed systems, there is one master machine but dozens to thousands of slave machines that store all of the data. If the master experiences data loss, all data is rendered useless, and if the master cannot be contacted, all data becomes inaccessible. Providing a system for transparently performing high-availability failover addresses both of these flaws.

As an added benefit, this design is particularly applicable to legacy systems that persist state via block device writes (such as by storing state to a file). Many services, such as Kerberos or all file-backed relational databases (e.g., PostgreSQL), fit this description. This design allows such services to be supported in an environment that provides synchronous, transparent failover with no data loss, turning single-machine legacy services into highly-available services.

In view of the above teaching, a person skilled in the art will recognize that the apparatus and method of invention can be embodied in many different ways in addition to those described without departing from the spirit of the invention. Therefore, the scope of the invention should be judged in view of the appended claims and their legal equivalents.

I claim:

1. A method for replicating states synchronously to provide for failover between nodes comprising machines of a high availability cluster serving at least one network client, said method comprising:
   a) identifying a number m of master candidates among said machines, where said number m is at least two;
   b) identifying a number n of quorum machines among said machines, where said number n is at least three and is odd;
   c) synchronously updating each of said m master candidates to maintain a current state;
   d) electing a current master from said number m of master candidates through a quorum-based majority vote among said quorum machines;
   e) issuing a current time-limited lease to said current master, said current timed-limited lease to be measured off by a local clock belonging to said current master, said current master running a service requested by said at least one network client while holding said current time-limited lease;
   f) bounding a relative clock skew of said current time-limited lease to an upper bound;
   wherein a failure of said current master triggers failover to a new master from among said number m of master candidates and issuance of a new time-limited lease to said new master, thereby preventing split brain situations between said master candidates.

2. The method of claim 1, further comprising the step of electing a current back-up master from said number m of master candidates through a quorum-based majority vote among said number n of quorum machines.

3. The method of claim 2, wherein said new master is said current back-up master, and said failover is to said current back-up master.

4. The method of claim 1, wherein said step of bounding said relative clock skew comprises:
   a) estimating said relative clock skew by comparing delays between data corrections; and
   b) adjusting said upper bound based on said delays between said data corrections.

5. The method of claim 1, wherein said upper bound is determined from a physical property of said local clock.

6. The method of claim 5, wherein said physical property is selected from the group consisting of thermal drift and oscillator drift.

7. The method of claim 1, wherein said upper bound is determined from comparison with a central clock.

8. The method of claim 1, wherein said current time-limited lease is on the order seconds to tens of seconds.

9. The method of claim 1, further comprising dynamically expanding said number m of master candidates by:
   a) identifying a new candidate machine belonging to said high availability cluster;
   b) synchronously updating said new candidate machine to maintain said current state;
   c) adding said new candidate machine to said number m of master candidates and incrementing said number m.

10. The method of claim 1, further comprising dynamically contracting said pool of master candidates by:
    a) identifying a predetermined candidate machine among said number m of master candidates;
    b) removing said predetermined candidate machine from said number m of master candidates and decrementing said number m.

11. The method of claim 1, wherein said service comprises a legacy application served to said at least one network client from a resource of said high availability cluster.

12. The method of claim 1, wherein said step of synchronously updating is performed over a local area network and wherein said service comprises communication over a wide area network.

13. The method of claim 1, wherein said number m of master candidates and said number n of quorum machines comprise different machines.

14. The method of claim 13, further comprising the step of isolating said number n of quorum machines from each other.

15. A method of operating a high availability cluster serving at least one network client to provide for failover between nodes comprising machines of said high availability cluster without split brain situations, said method comprising:
   a) identifying a number m of master candidates among said machines, where said number m is at least two;

b) identifying a number n of quorum machines among said machines, where said number n is at least three and is odd;

c) synchronously updating each of said m master candidates to maintain a current state;

d) electing a current master from said number m of master candidates through a quorum-based majority vote among said quorum machines;

e) issuing a current time-limited lease to said current master, said current timed-limited lease to be measured off by a local clock belonging to said current master, said current master running a service requested by said at least one network client while holding said current time-limited lease;

f) bounding a relative clock skew of said current time-limited lease to an upper bound;

wherein a failure of said current master triggers failover to a new master from among said number m of master candidates and issuance of a new time-limited lease to said new master, thereby preventing split brain situations between said master candidates.

16. The method of claim 15, further comprising the step of electing a current back-up master from said number m of master candidates.

17. The method of claim 16, wherein said new master is said current back-up master, and said failover is to said current back-up master.

18. The method of claim 15, wherein said step of bounding said relative clock skew comprises an adjustment determined from a physical parameter selected from among the group consisting of a delay between data corrections, a physical property of said local clock, a drift between said local clock and a central clock.

19. A high availability cluster with failover capability between nodes comprising machines of said high availability cluster without split brain situations, said high availability cluster comprising:

a) a number m of master candidates identified among said machines, where said number m is at least two;

b) a number n of quorum machines among said machines, where said number n is at least three and is odd;

b) a local area network for synchronously replicating and updating states among said number m of master candidates to maintain a current state;

c) a quorum-based majority vote protocol among said quorum machines for electing a current master from among said number m of master candidates;

d) a mechanism for issuing a current time-limited lease to said current master, said current time-limited lease to be measured off by a local clock belonging to said current master;

e) a physical parameter for bounding a relative clock skew of said current time-limited lease to an upper bound;

wherein a failure of said current master triggers failover to a new master from among said number m of master candidates and issuance of a new time-limited lease to said new master, thereby preventing split brain situations between said master candidates.

20. The high availability cluster of claim 19, wherein said quorum-based majority vote protocol is Paxos.

21. The high availability cluster of claim 19, wherein said master candidates are NameNode master candidates.

22. The high availability cluster of claim 19, wherein said physical parameter is selected from the group consisting of a delay between data corrections, a physical property of said local clock, a drift between said local clock and a central clock.

23. The high availability cluster of claim 19, wherein said nodes comprise a distributed storage system with block storage devices.

* * * * *